Figure 8:
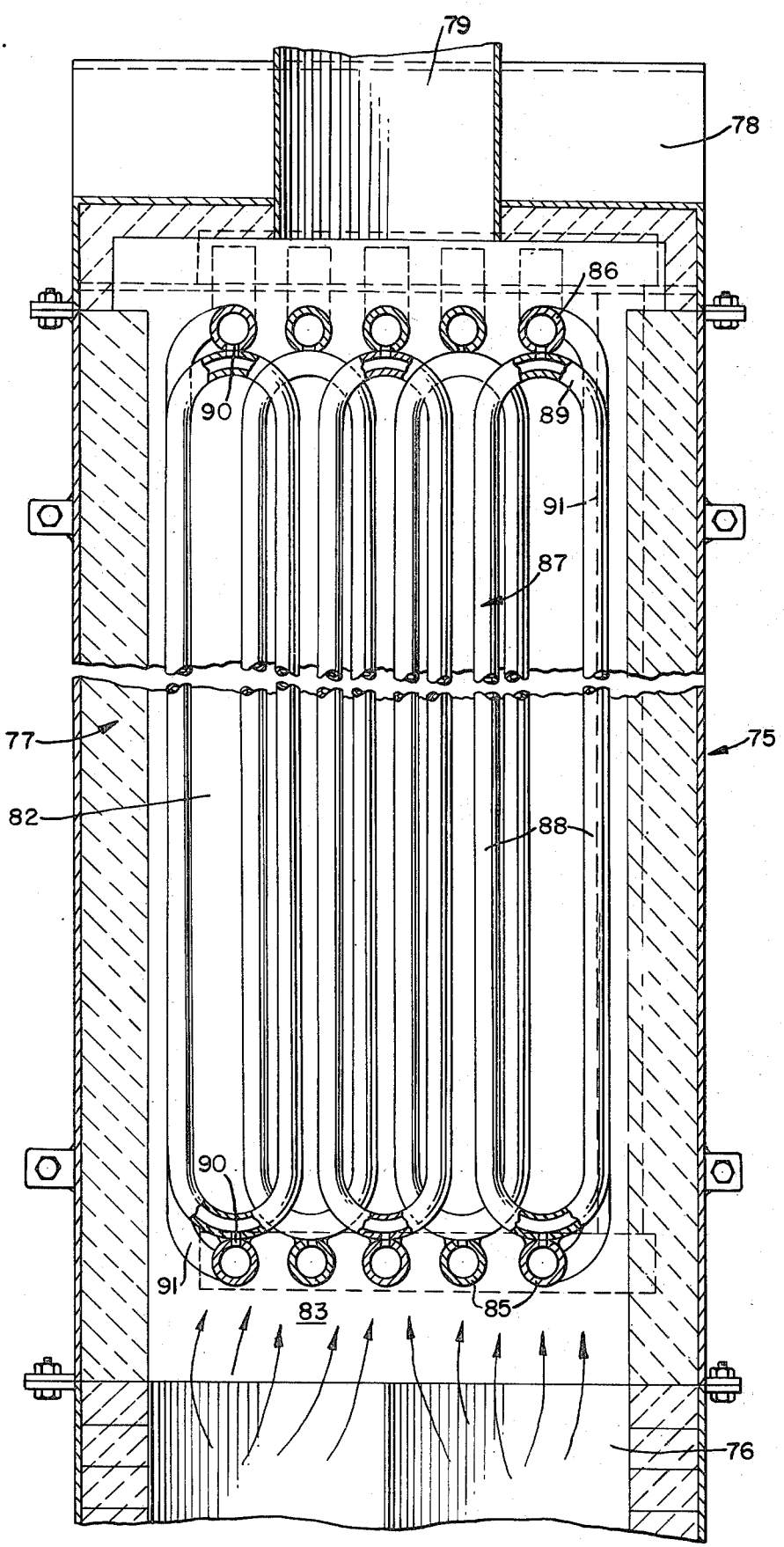

United States Patent [19]

Mailander, Sr.

[11] 4,171,770

[45] Oct. 23, 1979

[54] POULTRY BROODER SYSTEM

[76] Inventor: John H. Mailander, Sr., P.O. Box 3595, Rte. 4, Ocean Pines, Berlin, Md. 21811

[21] Appl. No.: 925,632

[22] Filed: Jul. 17, 1978

[51] Int. Cl.$^2$ ............................................ A01K 41/02
[52] U.S. Cl. ........................................ 237/3; 237/8 R; 237/14; 236/6; 119/30; 98/42 R
[58] Field of Search .................. 237/3, 4, 14, 15, 49, 237/71, 79, 8 R, 9 R; 432/223; 98/42 R, 40 VT; 122/333; 236/3, 6; 119/30-34

[56] References Cited

U.S. PATENT DOCUMENTS

| | | | |
|---|---|---|---|
| 1,042,635 | 10/1912 | Adair | 237/15 |
| 1,174,586 | 3/1916 | Kehm | 237/71 |
| 1,224,061 | 4/1917 | Bond | 237/15 |
| 1,618,792 | 2/1927 | Wood et al. | 98/40 VT |
| 1,776,080 | 9/1930 | Murray | 237/79 |
| 1,876,325 | 9/1932 | Crawford et al. | 119/34 |
| 2,477,824 | 8/1949 | Reiss | 165/96 |
| 2,784,945 | 3/1957 | Fodor | 237/8 R |
| 2,872,162 | 2/1959 | Manini | 165/96 |
| 2,984,082 | 5/1961 | Coblentz | 62/180 |
| 3,206,121 | 9/1965 | Bentley | 237/15 |
| 3,396,704 | 8/1968 | Hillstrom | 119/31 |
| 3,595,476 | 7/1971 | Eaton | 237/9 R |
| 3,829,285 | 8/1974 | Beck | 432/223 |
| 3,970,048 | 7/1976 | Finger et al. | 122/276 |

Primary Examiner—Henry C. Yuen
Attorney, Agent, or Firm—Emory L. Groff, Jr.

[57] ABSTRACT

A poultry raising system includes a house having one or more enclosed sections with at least one section provided with a plurality of hovers and all of the sections having peripheral heat assemblies. All hovers and heat assemblies are equipped with sealed heat radiating conduits supplied with a fluid heat transfer medium from a common heating apparatus. A supply and return line serving each section from the heating apparatus includes a thermostatically-controlled valve admitting the heat transfer medium to all of a section's hovers as well as other thermostatically controlled valves regulating the flow of heat transfer medium to each of a section's peripheral heat assemblies. Dampers in roof-top vents are automatically opened and closed in response to signals from a gas sensor in each section to evacuate obnoxious gasses from each section enclosure and the evacuated gas is replaced by fresh outside air admitted through automatic dampers adjacent the house side walls. Improved efficiency is obtained by employing a pair of heating chambers in the heating apparatus and by extracting otherwise lost heat from waste flue gasses to pre-heat air for combustion in the heating chambers.

19 Claims, 11 Drawing Figures

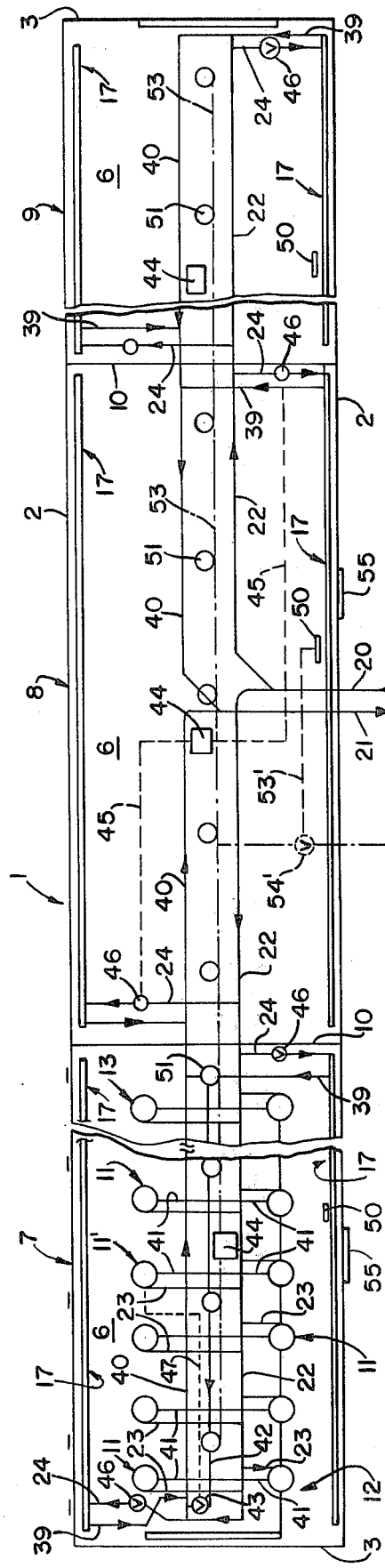
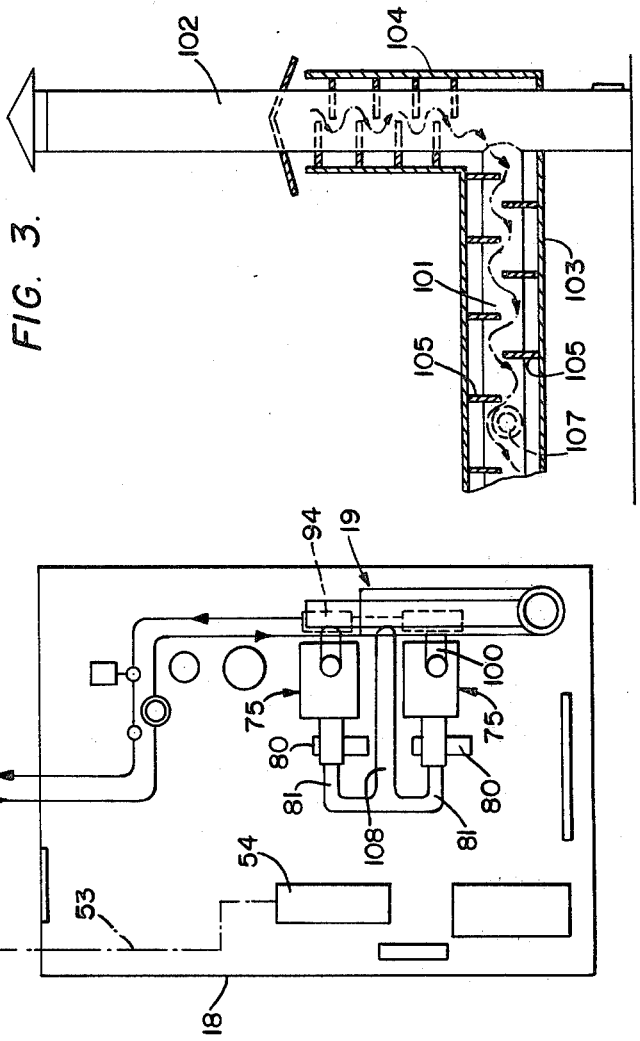
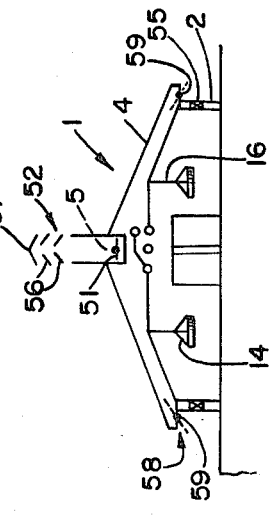
FIG. 1.
FIG. 3.
FIG. 2.

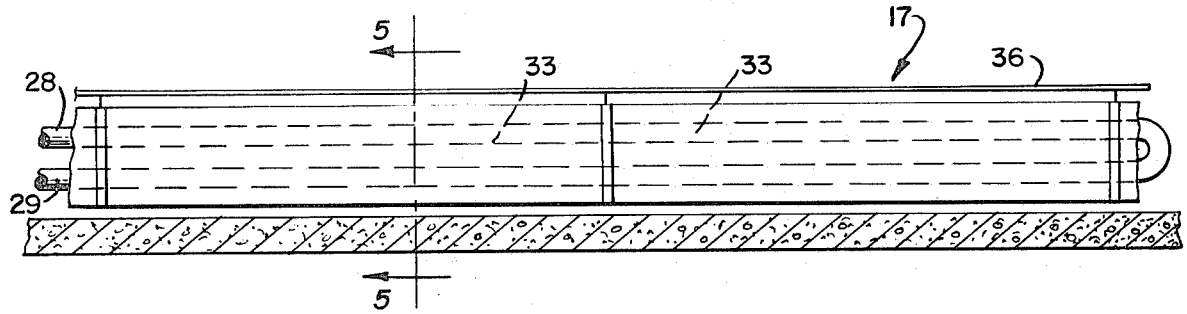
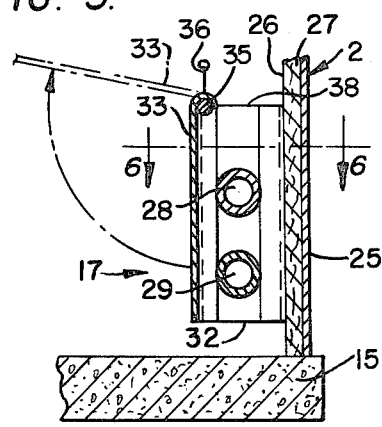
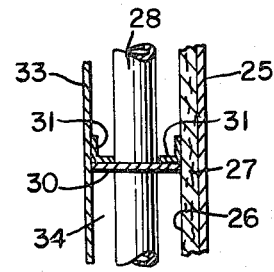
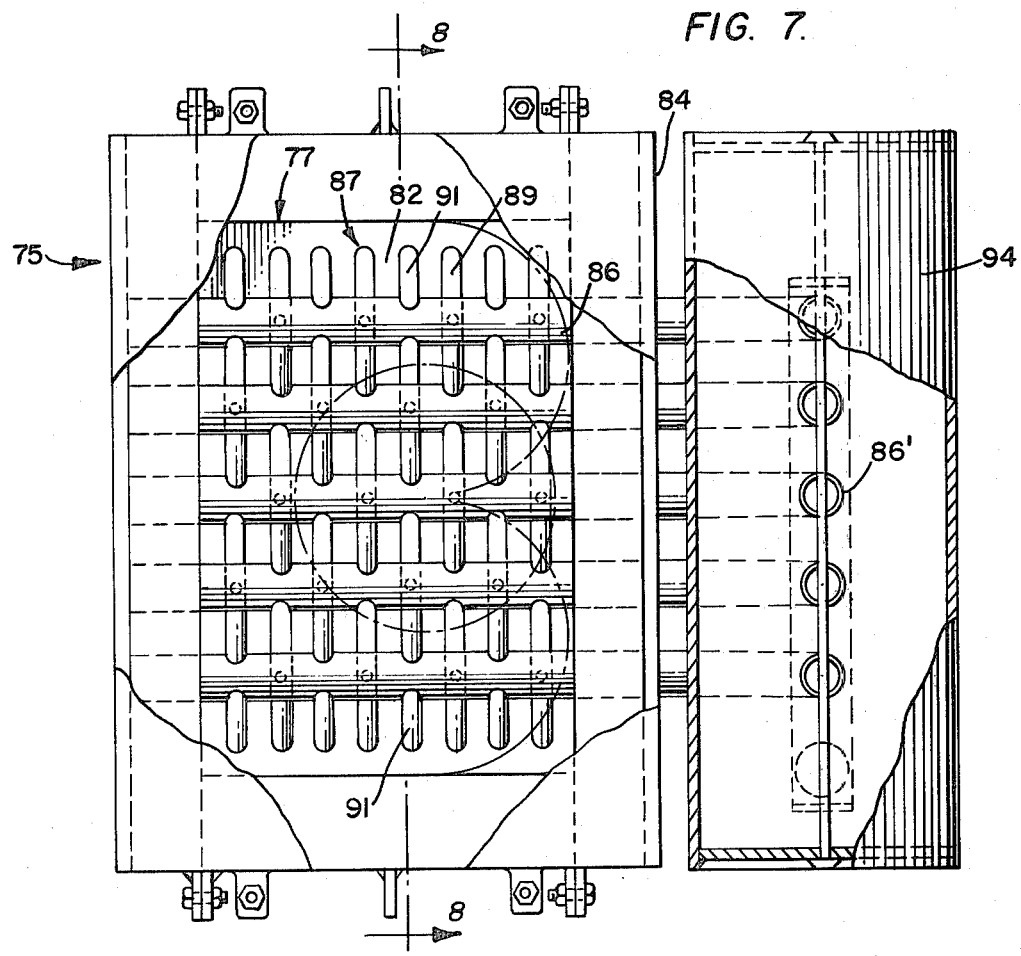

POULTRY BROODER SYSTEM

This invention relates generally to poultry brooders, and more particularly, to an improved system for heating and controlling the atmospheric conditions in brooder houses.

In the brooder houses of one of this country's major poultry producing areas, the vast majority of the houses are heated by means of liquid petroleum gas (LPG). This heat producing fuel has served as ready means for operating relatively simple hovers containing open flame burners. Many such hovers are provided with three-position thermostats and the reliability of these installations leaves much to be desired since experience has shown that often the burners will shift into a higher heat output than that which has been pre-selected. Notwithstanding the foregoing, the most critical aspect of employing LPG-supplied hovers is the present enormous increased cost of such fuel and the decided likelihood of future criticality of the supply thereof.

Other parameters associated with gas flame heating systems and which play a definite role in the overall poultry raising program, include the undesirable build-up of growth-retarding gases leading to an unhealthy atmospheric environment in the brooder enclosures. The employment of open flame gas-fired heaters results in an absorption of all of the available oxygen in the brooder house in a very short period of time. Additionally, the burning of the gas creates carbon monoxide and during the operation of the burners, forms carbon dioxide. In an effort to alleviate the situation within many systems, operators include very high velocity fan in the brooder enclosures which are designed to move the air therein at a rate of 200–250 cubic feet per minute, which action consequently produces an induced cold fresh air that must be immediately heated in order to preclude an unhealthy situation for the poultry. This latter required action quite naturally further increases the quantity of fuel necessary to maintain an acceptable temperature in the brooder.

Another problem encountered in brooder systems is the gas given off by the poultry excrement, principally ammonia. Means must be provided be prevent the build-up of this dangerous gas, regardless of the type of heating system being used. Of the three gases mentioned, ammonia is the lightest and both ammonia and carbon monoxide are lighter than air, while carbon dioxide is heavier than air. Accordingly, it is preferable that means be provided to prevent build-up of any of these gases to a dangerous level. The present invention proposes means for providing automatically regulated heating of brooder enclosures by means of an improved fluid heat transfer medium delivered to both a plurality of hovers as well as peripheral heat assemblies adjacent the walls of the brooders which heating system is combined with roof-top vents actuated by sensors automatically opening and closing the vents to preclude the build-up of ammonia below a level of 18 inches above the floor of the brooder.

Barometrically regulated fresh air vents and automatically controlled fans are included and the combination of the foregoing structure results in a far more healthier atmospheric environment for the poultry thereby increasing the growing rate and reducing the time period for readying the poultry for market.

Combined with the foregoing structure is an improved system heating apparatus including one or more heaters arranged in a novel manner intended to more efficiently maintain the fluid heat transfer medium at a very high temperature, up to say 300° F. The heaters acting upon the chemical heat transfer medium may be fired by any suitable fuel such as oil, gas, coal, or wood as it will be understood that it is the arrangements of the chambers of the system heating apparatus together with its attendant struture that results in a far more efficient system with a substantial savings of fuel.

Accordingly, one of the objects of the present invention is to provide an improved poultry brooder system including a poultry house having brooders therein radiantly providing heat by means of a fluid heat transfer medium which is heated by means of heating apparatus remotely disposed with respect to the hovers.

Another object of the present invention is to provide an improved poultry brooder system including a house provided with a plurality of hovers each having a sealed conduit supplied with a liquid heat transfer means heated by a remotely disposed heating apparatus and including additional heat assemblies disposed peripherally within the house enclosure and being supplied with the same fluid heat transfer means.

Still another object of the present invention is to provide an improved poultry brooder system including a plurality of hovers and peripheral heat assemblies within a house enclosure and which are all supplied with a liquid heat transfer means, the flow of which is automatically regulated by temperature sensor means within the enclosure.

A further object of the present invention is to provide an improved poultry brooder system including a heating apparatus for supplying fluid heat transfer medium to heating means within the brooder enclosure and wherein the apparatus is provided with a chamber, the intake air for which is preheated by counter-current flow about the heating apparatus exhaust flue.

Another object of the present invention is to provide an improved poultry brooder system including a housing enclosed provided with a plurality of roof-top vents each having a damper regulated by automatic means disposed within the housing to preclude the build-up of ammonia gas below a prescribed level above the housing floor.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawings in which:

FIG. 1 is a top plan fragmentary view schematically illustrating the poultry brooder system of the present invention.

Figure 9:
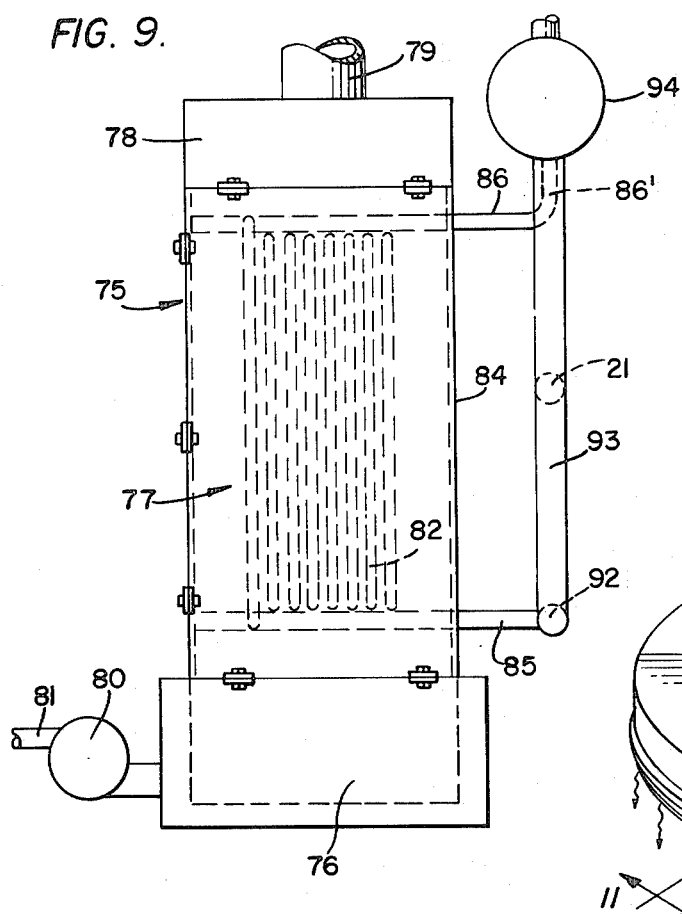
Figure 10:
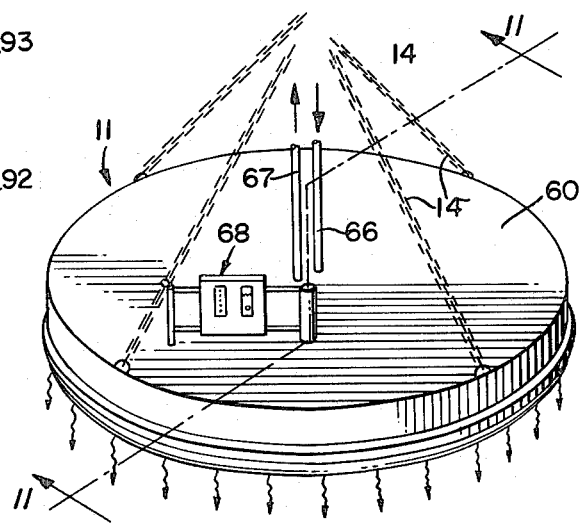
Figure 11:
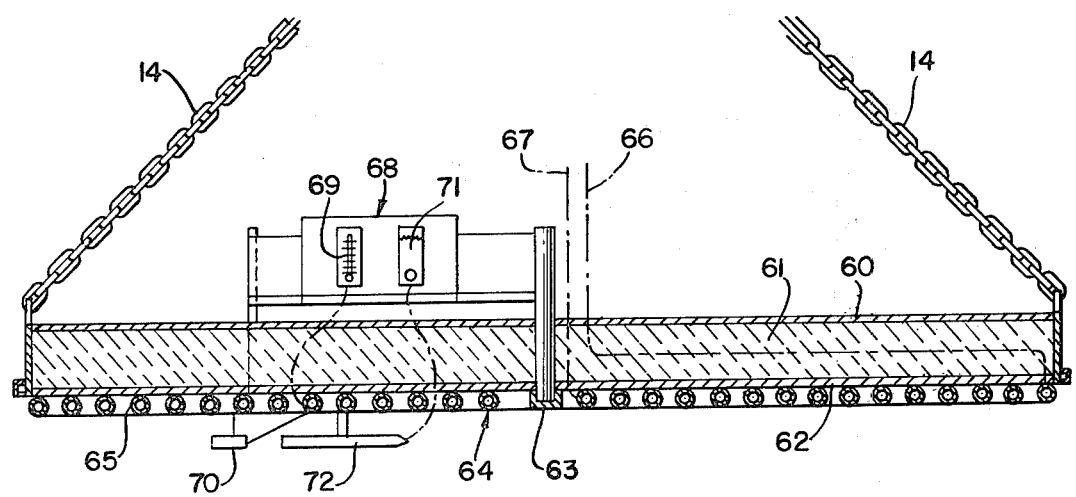

FIG. 2 is a diagrammatic illustration of an end elevation of the house shown in FIG. 1, FIG. 3 is an enlarged side elevation view, partly in section, of the flue exhaust and fresh air intake for the system heating chambers, FIG. 4 is a fragmentary front elevation of one of the peripheral heat assemblies, FIG. 5 is an enlarged vertical transverse sectional view taken along line 5—5 of FIG. 4, FIG. 6 is a horizontal sectional view taken along the line 6—6 of FIG. 5, FIG. 7 is a top plan view, partly broken away, of one of the heating chambers of the system heating apparatus, FIG. 8 is a vertical sectional view taken along the line 8—8 of FIG. 7, FIG. 9 is a side elevation of one of the system heaters as shown in FIG. 1, FIg. 10 is a top perspective view of one of the hovers, and FIG. 11 is a transverse vertical sectional view taken along the line 11—11 of FIG. 10.

Similar reference characters designate corresponding parts throughout the several figures of the drawings.

Referring now to the drawings, particularly FIG. 1, the present invention will be seen to relate to a poultry brooder system including a poultry house generally designated 1 and including lateral side walls 2—2 bounded by end walls 3—3. A peaked roof 4 having an uppermost ridge 5 completes the primary structural components of the house 1, which components cooperate to define an interior or enclosure 6 therein which may be readily selectively divided into first, second and third sections 7, 8 and 9 respectively, by suitable dividing means such as the roll-up partitions 10, as well known in the art.

At least the first house section enclosure 6 is provided with a plurality of hovers 11 preferably disposed in an equally spaced apart manner to define a first row 12 and second row 13 as shown in the left hand portion of FIG. 1 of the drawings. The specific construction of the hovers 11 will be described hereinafter and it will be understood that suitable structure such as the suspension means 14 is provided to support the plurality of hovers in a desired elevation with respect to the poultry house floor 15. The suspension means 14 in turn is connected to a hoist line 16 with the various hoist lines leading to a common point at one end of each house section for ready manipulation of all of the hovers 11 of the rows 12 and 13.

Additional heat for the first section 7 and the sole source of heat for the remaining sections is provided by means of a peripheral heat assembly generally designated 17 comprising a longitudinally extending heat exchange structure disposed adjacent the baseboard of each of the house side walls 2. Both of the peripheral heat assemblies 17 and the hovers 11 provide radiant heat by means of sealed pipe conduits supplied with a fluid chemical heat transfer medium such as silicone. The composition is heated and supplied under pressure from a mechanial equipment room 18 disposed adjacent the exterior of the house I, preferably juxtaposed the medial portion of the second porton 8. Disposed within the mechanical equipment room 18 is a system heating apparatus generally designated 19 and the details of which will be described later on. At the present time it will suffice to understand that the heating apparatus 19 is selected to provide means capable of delivering under pressure, a fluid chemical heat transfer medium to the heating apparatus supply line 20 which line passes from the equipment room 18 to the second section 8 of the poultry house 1. An appropriate heating apparatus return line 21 delivers the cooled fluid chemical heat transfer medium back to the system heating apparatus 19 from the poultry house 1.

The arrangement of the heat transfer medium supply and return structure as it relates to both the hovers 11 and peripheral heat assemblies 17 may now be described. The heating apparatus supply line 20, upon entering the second section 8 of the house 1, communicates with a longitudinally extending section supply line 22 extending substantially the length of the brooder house 1 and adjacent the center line thereof. This section supply line 22 in turn communicates with a plurality of hover supply lines 23 individually disposed adjacent to and connected to the intake of the radiating elements on the bottom surface of the hovers.

The section supply line 22 additionally, at each end of the sections 7, 8 and 9 communicates with one of each of the two peripheral heat assemblies 17 in each section by means of the peripheral supply line 24. It should be noted that the supply line 24 serving one of the peripheral heat assemblies 17 in each house section is connected to the section supply line 22 adjacent one end of the respective section while the other supply line 24 is connected to the other peripheral heat assembly 17 for that section at the opposite end of the section. This arrangement of tapping off of the section supply line 22 at opposite ends thereof for the two peripheral heat assemblies 17 is important for the resultant balancing of demand upon the overall supply line of the system and contributes to the more even heat distribution obtained with the instant invention. At this poin it would be well to consider generally the construction of each of the peripheral heat assemblies 17 which are shown more in detail in FIGS. 4-6 of the drawings.

Each side wall 2 includes an exterior 25 and spaced interior wall 26 containing insulation 27 therebetween. The peripheral heat assemblies 17 are affixed to the interior walls 26 adjacent the brooder house floor 15. Each heat assembly 17 includes two tubes 28 and 29 fixedly mounted in a vertically spaced apart and parallel manner with a substantial space between the upper tube 28 and the lower tube 29. The tubes are retained in their fixed position by means of a plurality of hanger brackets 30 which are in turn affixed to flange members 31 along their opposite vertical edges. The bottom 32 of each assembly is substantially spaced above the surface of the floor 15 and the assembly may be readily retained in this position by suitable fasteners (not shown) extending through the flange members 31 abutting the interior wall 26. A depending skirt 33 encloses the paired tubes 28-29 in a manner that a vertically extending heating duct 34 is formed which is open at the top and the bottom of the assembly and bounded along one side by the interior wall 26 and on the other side by the skirt 33. The top edge of the skirt 33 is rolled about a pivot pin 35 so that the skirt may be displaced from its normal full line position as shown in FIG. 5 of the drawings to the alternate illustrated elevated position for the purpose of blowing or cleaning out debris which normally will tend to accumulate within the duct 34.

Disposed atop the upper edge of the skirt 33 is an upstanding non-roost element 36 so as to preclude roosting of birds atop the assembly 17. Maximum heat exchange ability with the disclosed peripheral heat assembly 17 has been found to be obtainable by employing one and one half inch tubes 28-29, vertically aligned above one another on five inch centers and with the bottom edge 37 of the skirt 33 normally disposed a distance of two inches from the surface of the floor 15. In this manner, maximum heating of a cold air flow disposed atop the floor 15 occurs when this cold air is drawn upwardly through the duct 34 and heated by the tubes 28-29 containing the heated fluid chemical heat transfer medium. With the described dimensions a maximum wipe of the periphery of the two tubes is obtained by the upwardly drawn air within the duct 34 such that improved heat transfer occurs with the most efficient discharge of warm air from the top opening 38 of the assembly 17.

As previously mentioned, only a single peripheral supply line 24 is provided for each heat assembly 17 and this line is preferably connected to one end of the lower tube 29 with the opposite end of that line being connected in turn to the adjacent end of the upper tube 28 as shown in the right hand portion of FIG. 4 of the drawings. In this manner it will be understood that the moving fluid heat transfer medium within the systen will be brought from one end of the lower tube 29 into the adjacent end of the upper tube 28 with the ever decreasing heat capacity of the moving heat transfer medium passing over the ever increasing temperature of the counter-current flowing transfer medium in the lower tube 29. When the transfer medium reaches the end of the upper tube 28, it communicates with the peripheral return line 39, the distal portion of which communicates with a longitudinally extending section return line 40.

This latter return line 40 will be seen to be disposed substantially parallel to the section supply line 22 and in addition to receiving the return heat transfer medium from the peripheral heat assemblies 17, also receives the return flow of the heat transfer medium from all of the hovers 11 being utilized. It is important to note however, that the hovers 11 do not directly connect with the longitudinal section return line 40 but instead, the return line 41 from each hover is joined to a separate hover manifold return line 42 having an automatic control valve 43 as its open end for regulating the flow of the return heat transfer medium into the section return line 40.

The enclosure 6 of each section is provided with a centrally mounted heat sensor 44 electrically connected by circuits 45—45 to heat control valves 46 in the supply line 24 leading to each peripheral heat assembly 17 serving that section. Thus, means are provided for automatically requlating the valves 46—46 in each section 7, 8 or 9 according to the setting of the sensor 44 in order to open and close the peripheral supply lines 24 so as to properly actuate the peripheral heat assemblies 17 as needed.

The hovers 11, on the other hand, will be understood to be regulated by means of the control valve 43 disposed beyond the exit end of the hover manifold return line 42 and the regulation of this valve 43 will be described in connection with the structure of the hovers per se hereinafter.

As previously mentioned, an important feature of the present invention is the provision of means for automatically detecting and eliminating a dangerous build-up of ammonia gas within the confines of each housing section enclosure 6. To this end, an ammonia sensor 50 is positioned adjacent one side wall 2 of each section and upon sensing a predetermined concentration of ammonia, causes actuation of the damper 51 in each one of a plurality of venturi vents 52 communicating with the section enclosure from the ridge 5 of the house roof. Each damper 51 may be actuated by any suitable well known means such as a pneumatically operated piston or magnetic means (not shown). In the illustrated mode an air supply line 53 from a compressor 54 in the equipment room 18 leads to the damper 51 of all of the vents 52 for operating same upon receipt of a command signal from the sensor 50 by way of the circuit 53' leading to a control valve 54'. Upon the actuation of the valve 54' and the opening of the venturi vent dampers 51, an intake fan 55 mounted through a portion of the house section side wall 2 is actuated to admit fresh outside air into the midportion of the section enclosure 6 and this action, coupled with the concurrent opening of the vent dampers 51, rapidly and most efficiently evacuates the accumulates ammonia gas from the enclosure. Since the ammonia is substantially lighter than air, this gas will accumulate in the enclosure from the ridge line of the roof on downwardly until the sensor 50 is actuated and thus it will be appreciated, that the ammonia is easily exhausted from the top of the enclosure with very little assistance being required of the incoming fresh air produced by the fan 55. Alternatively, the sensor 50 may comprise a clock-timer such that periodically, the damper control valve 54' is operated to open the venturi vents 52 and operate the intake fan 55. A still further embodiment is to provide a combined sensor and timer wherein if the gas build-up should reach a dangerous level between periodic timed operations of the venting system, then the sensor would immediately operate the valve 54' in order to rid the section of all ammonia gas.

The efficiency of the gas exhaustion by means of the above structure is further increased by providing a plurality of venturi rings 56 disposed in a stacked manner atop the vent 52 and capped by means of the hat 57. Appropriate spacer bars or struts (not shown) serve to maintain the plurality of rings 56 and the hat 57 in the desired stacked relationship shown in FIG. 2 of the drawings so that upon opening of the damper 51, the exit of the lighter-than-air gas will be accelerated and its dissipation from the vent enhanced due to the influx of atmospheric air drawn inwardly between the rings 56 by the venturi action imparted to the rising gas.

The foregoing described structure is illustrated in combination with a system employing a sealed or enclosed fluid chemical heat transfer medium such as silicone and thus is intended to primarily insure efficient evacuation of dangerous ammonia gas. It will however, be appreciated that the same venting arrangement may be employed in any poultry brooder system using other heating means such as open flame burners and in such latter instances would not only serve to remove ammonia but also to assist in evacuating the dangerous concentration of carbon monoxide and carbon doixide so prevalent with open gas burners.

As shown in FIG. 2 of the drawings, the roof eaves overhand or project beyond the top of the house side walls 2 thereby providing a soffit 58 in this area and such construction readily lends itself to the provision of fresh air dampers 59 therein. Such dampers provide alternative means for the admission of atmospheric air into the various enclosures 6 whenever stale, contaminated air is released through the roof top vents 52. These dampers 59 are preferably barometrically operated such that when a negative pressure is created within the enclosure by operation of the vents 52, then an equal volume of fresh air is admitted therethrough into the enclosures and in view of their location above the top of the side wall 2 this insures that the incoming fresh, cooler air will be passed through the already warmed air within the house and co-mingled therewith in a manner precluding the formation of cold air pockets or drafts which is so prevalent in many of the existing installations wherein fans or vents for admitting cold air into a brooder house are located adjacent the floor thereof.

The specific structure of the hovers 11 will be readily apparent from FIGS. 10 and 11 of the drawings wherein it will be seen that the suspension means 14 supports a housing including a planar cover 60 having disposed therebeneath a substantial thickness of insulation such as glass fiber 61. Positioned beneath this insulation is a thinner layer of additional heat insulation material such as an air-cell board 62 which latter layer has its bottom surface painted with a high temperature resistance black coating.

Attached to the bottom exposed surface of the layer 62 are a plurality of radially extending mounting elements 63 such as channels which provide means for supporting and attaching the heat radiating structure, generally designated 64.

The heat radiating structure 64 preferably comprises a unitary tubular member such as a spirally wound continuous coil 65 having its two end portions 66, 67 disposed medially above the circular radiating structure 64. The end 66 serves as the supply portion of the coil 65 and thus will be suitably connected to one of the hover supply lines 23 while the exhaust end 67 of the coil 65 is adapted to be connected with the hover manifold return line 42. In this manner it will follow that the fluid heat transfer medium arriving at any particular hover 11 will be directed to the outer-most convolution of the heat radiating structure 64 and, as this heat transfer material is pumped toward the center of the hover, it will progressively decrease in temperature. It should now be appreciated that a more uniform dispersal and retention of heat beneath any one of the hovers 11 is achieved inasmuch as the hottest part of the heat transfer medium will initially pass through the outermost convolution thereby tending to assist in retaining the maximum amount of heat within the confines beneath the entire hover undersurface and discouraging cold fringe areas throughout the periphery of the hover.

The provision of the hover manifold return line 42 will be understood to introduce what may be called a circle-back system. This system substantially increases the efficiency of the combined hovers as it will be seen that the hover 11 closest to the system heating apparatus has its return line 41 feeding into the manifold return line 42 at the farthest point from the hover control valve 43 and its connection with the section return line 40. By this arrangement, all hovers are brought up to the selected temperature within a matter of only a few seconds after being activated.

Regulation of the temperature of the various hovers 11 in the section 7 of the brooder house 1 is maintained by means of a monitor device, generally designated 68, mounted atop the cover 60 of one of the centrally disposed hovers within the house section. As shown in FIG. 1 of the drawings, hover 11' serves as the monitor hover for all the hovers in the section 7 and will include the monitor device 68 therewith. This monitor device includes a thermometer 69 having a temperature readout bulb 70 spaced beneath the heating coils 65, as well as a thermostatic control 71 which in turn is connected to a control sensor 72, likewise disposed beneath the heating coil 65. Thus, by setting the thermostatic control 71 to the desired temperature level, the operator can expect all of the hovers within the section to operate at a precise capacity as dictated by the flow of heat transfer medium through the various coils 65 in order to achieve the pre-set temperature. This flow action is achieved through the hover heat control valve circuit 47, leading to the automatic hover control valve 43.

Hovers 11 are illustrated in but only the first house section 7 since the usual poultry house employs these hovers only during the first two weeks in the development of the newly hatched birds after which the first partition 10 is opened and the birds are raised in both sections 7 and 8. At still a later stage the second partition is opened and all three sections utilized as a single enclosure 6. After the opening of the partitions the hovers are raised by means of the hoist lines 16 and all further heating is provided solely by the peripheral heat assemblies 17 as described hereinbefore.

As previously described, the system heating apparatus generally designated 19 and contained in equipment room 18, preferably includes a pair of system heaters or heating chambers 75 for raising and maintaining the temperature of the fluid chemical heat transfer medium provided within the interior of all of the supply and return lines feeding the various hovers and peripheral heat assemblies.

These system heaters or heating chambers are preferably of identical construction with one such chamber being shown most clearly in FIG. 9 of the drawings to include a fire box or base 76 disposed beneath a heater core section 77 which is bounded at its top by means of the smoke hood 78 having an exhaust stack 79 thereon. The fire box 76 will be of a suitable construction designed to obtain maximum efficiency from the particular type of fuel being employed. As mentioned, wood, coal, oil or gas may be used in association with the instant heating chambers 75. The installation shown in FIG. 9 of the drawings discloses a dual, gas-oil burner 80 having a combustion air inlet 81.

The purpose of providing a pair of the chambers 75 rather than a single larger one is to achieve a further efficiency of approximately 2.3% at the burner stage of the system. With one of the burners set to raise the heat transfer medium to 300° F. the other burner can be set for say 285° F. In this manner only the first chamber 75 need be used during the milder seasons of the year, with the second chamber coming on line only when extreme low temperatures prevails, thereby precluding the expense and inefficient need to operate at maximum level year around.

The interior construction of the heater core section 77 will be most readily apparent from a review of FIGS. 7 and 8 of the drawings. The insulated walls of the heater core section 77 will be seen to define a relatively large vertically extending heat transfer cavity 82 therewithin, the bottom 83 of which communicates directly with the interior of the fire box 76. Disposed through the bottom portion of the rear wall 84 of the core section 77 are a plurality of horizontally disposed return tubes 85 while a similar number of horizontally disposed supply tubes 86 project from the rear wall 84 adjacent the upper limits of the cavity 82 therein. All of the tubes 85 and 86 extend horizontally across the full depth of the core section cavity 82 and are laterally spaced apart a substantial distance yet preferably no greater distance than the outer diameter of the tubes 85-86.

Each pair of vertically aligned and oppositely disposed tubes 85 and 86 are rigidly joined to the opposite curved ends of one of a plurality of similarly configured oval-shaped heat transfer tubes 87. The major extent of each tube 87 comprises two straight, parallel walls 88 communicating with the smoothly curved end walls 89 at both ends. The horizonal tubes 85 and 86 are suitably welded to the end portions of the heat transfer tubes 87 and include a passage 90 therethrough to allow the smooth flow of the fluid chemical heat transfer medium therethrough.

From a review of FIGS. 7 and 8, the alternating or staggered arrangement of the plurality of tubes 87 between each adjacent pair of horizontal tubes 85 and 86 will be readily appreciated. The spacing of the various tubes insures a maximum disposition of the bodies of the heat transfer tubes 87 within the upward flow path of heated air issuing from the fire box 76 and on its way to the exhaust stack 79. The straight side wall 88 of each tube 87 will be seen to extend laterally to a point beneath or above the vertical plane of the periphery of the adjacent supply and return tubes 86 and 85. Since a void would normally occur between each tube 87 attached to the two outermost tubes 85 and 86, a plurality of half tubes 91 are positioned in these vacant areas with their distal portions elevated above the curved end walls 89 of the adjacent heat transfer tubes and welded to the lateral periphery of the two outermost horizontal tubes 85 and 86 such that full utilization is made of all available space within the cavity 82 for the most efficient heat transfer as the colder returned fluid heat transfer medium enters all of the bottom return tubes 85 and passes upwardly through the various heat transfer tubes 87 and 91 and outwardly from the heating chamber by way of the supply tubes 86.

The horizontal return tubes 85 receive the returned cooled heat transfer medium from a return header 92 which is joined to the return line 21 from the house 1 by means of a vertical conduit 93 as shown in FIGS. 7-9 of the drawings. The heated heat transfer medium as it leaves the heating chamber 75 by way of the plurality of supply tubes 86 will be understood to be elevated to a temperature to up to 300° F. and is projected, by means of the upwardly extending tubes 86' at the end of the horizontal tubes 86, into the bottom of a mixer drum 94. The conduit 93 communicates at its top with the bottom of the drum 94 to provide the required closed loop system necessary in all boiler apparatus. The co-mingling of the various streams of the fluid heat transfer medium within the interior of the mixer drum 94 produces a constant-temperature product therewithin prior to the exit into the supply line 20 from the top of the drum of the heated fluid which of course, rises to the top thereof.

A further increase in efficiency is obtained by utilizing the otherwise lost heat contained in the exhaust gases emitted through the stacks 79 of the heating chambers 75. As shown in FIGS. 1 and 3, these stacks 79 are each provided with an elbow 100 communicating with the horizontal exhaust pipe 101 leading to the vertically disposed flue 102. The exterior of the entire exhaust pipe 101 is surrounded with a concentrically disposed pre-heat casing 103 while a vertical pre-heat stack 104 is similarly disposed about the flue 102. The casing 103 and stack 104 are mounted in a fixed manner spaced about the exterior of the exhaust pipe and flue by means of a plurality of baffles 105 transversely disposed relative to axial extent of the pipe and stack and having axially adjacent edges staggered relative one another such that a circuitous air flow path from one end thereof to the other is provided between the two concentrically disposed components. If the two elbows 100 are affixed to the exhaust pipe 101 such that hot gases expelled thereby are all introduced into the interior of the exhaust pipe 101, it will follow that these gases will be directed upwardly and discharged from the flue 102 with a substantial amount of the heat contained within the traveling exhaust gases being absorbed by the material of the pipe 101 and flue 102. Experience has shown that a typical temperature for the flue gas is 400°-475° F. and, accordingly, advantage is taken of this otherwise lost heat by inducing the combustion air being supplied to the air inlets 81 of the heating chambers to enter the labyrinth offered by the baffles 105 and to traverse through the stack 104 and casing 103 until drawn through the opening 107 in the wall of the casing 103, which opening communicates with a main air inlet 108 supplying the heating chamber inlets 81 with air for combustion, which air is warmed to a temperature in the range of 150°-200° F.

I claim:

1. A poultry house having a roof and side walls establishing an enclosure, said enclosure defining at least one house section, a plurality of hovers within said enclosure section, a plurality of peripheral heat assemblies within said section adjacent said side walls, each one of said hovers and each one of said peripheral heat assemblies provided with a heat radiating conduit adapted to convey a fluid heat transfer medium therethrough, a section supply and a section return line within said house section extending substantially the length of said section, a hover manifold return line adjacent said section return line within said section and connected to said section return line, a hover supply line joining each said hover conduit to said section supply line, a hover return line leading from each said hover conduit to said hover manifold return line, a peripheral supply line and a peripheral return line respectively connecting said conduit of each said peripheral heat assembly to said section supply line and said section return line, a heating apparatus having supply and return lines joined to said section supply and return lines to provide a circulating heated fluid heat transfer medium to said conduits, first valve means disposed intermediate said hover manifold return line and said section return line and regulating the flow of said heat transfer medium through said hovers to said section return line, second, independent valve means regulating the flow of said heat transfer medium between said section supply and return lines and each said peripheral heat assembly conduit through said peripheral supply and return lines, and first and second independent temperature responsive means in said enclosure section controlling said first and second valve means to said hovers and said peripheral heat assemblies respectively, whereby upon opening of said first valve means said heat transfer medium is admitted substantially simultaneously to said conduits of all said hovers to minimize the occurrence of unequal temperature between any of said hovers.

2. A poultry house according to claim 1 wherein, said section supply and return lines each comprise a single line extending substantially the length of said enclosure section.

3. A poultry house according to claim 1 wherein, said house includes a plurality of displaceable partitions operable to define a plurality of said enclosure sections, said section supply and return lines leading to all said enclosure sections, all said enclosure sections provided with said peripheral heat assemblies, and a separate said second temperature responsive means in each said enclosure section controlling said peripheral heat assemblies within each respective enclosure section.

4. A poultry house according to claim 1 wherein, each said peripheral heat assembly conduit includes an upper and a lower tube joined at one end of said enclosure section, said peripheral heat assemblies adjacent oppositely disposed house side walls having said joined ends disposed at opposite ends of said enclosure section and said peripheral supply and return lines connected to said tubes at the ends thereof opposite said joined ends.

5. A poultry house according to claim 4 wherein, each said peripheral heat assembly includes a skirt adjacent said tubes having a bottom edge spaced above the floor of said house.

6. A poultry house according to claim 5 wherein, said skirt is pivotally attached adjacent its upper portion.

7. A poultry house according to claim 4 wherein, said second valve means for each said peripheral heat assembly is disposed in said peripheral supply line.

8. A poultry house according to claim 1 including, vent means through said roof, said vent means provided with a damper, regulator means joined to said damper to open and close said damper to allow evacuation of obnoxious gasses from said enclosure section.

9. A poultry house according to claim 8 wherein, said regulator means includes a gas sensor.

10. A poultry house according to claim 8 including, dampers adjacent the juncture of said roof and side walls operable to admit fresh air upon opening of said vent means damper.

11. A poultry house according to claim 10 wherein, said dampers adjacent said juncture of said roof and side walls are barometrically actuated in response to negative pressure within said enclosure during evacuation of air through said vent means.

12. A poultry house according to claim 8 wherein, said vent means includes a plurality of venturi rings facilitating the evacuation of said gasses therethrough.

13. A poultry house according to claim 1 wherein, said fluid heat transfer medium is silicone.

14. A poultry house according to claim 1 wherein, said heating apparatus includes a fire box, a core section atop said box provided with a heat transfer cavity, a plurality of vertical heat transfer tubes within said cavity, a plurality of return tubes joined to said heating apparatus return line each in turn communicating with the bottom of a plurality of said heat transfer tubes, a plurality of supply tubes joined to said heating apparatus supply line each in turn communicating with the top of a plurality of said heat transfer tubes, and heat generating means supplying heat to said heating apparatus fire box.

15. A poultry house according to claim 14 including, an exhaust stack atop said heat transfer cavity, said stack joined to a flue, pre-heat members surrounding said flue, and an air inlet communicating with the space between said flue and pre-heat members and joined to said heat generating means.

16. A poultry house according to claim 15 including, a plurality of baffles between said flue and pre-heat members whereby, a tortuous air flow therebetween is produced.

17. A poultry house according to claim 1 wherein, said hover heat radiating conduit includes a continuous coil having supply and exhaust ends.

18. A poultry house according to claim 17 wherein, said coil supply end is connected to the outer convolution of said hover conduit and said coil exhaust end is connected to the inner convolution thereof.

19. A poultry house according to claim 17 wherein, said hover temperature responsive means is disposed adjacent one of said hovers medially located within said enclosure section.

* * * * *